United States Patent
King

(10) Patent No.: US 12,205,248 B2
(45) Date of Patent: Jan. 21, 2025

(54) IMAGE PROCESSING USING FILTERING FUNCTION COVARIANCE

(71) Applicant: Imagination Technologies Limited, Kings Langley (GB)

(72) Inventor: Rostam King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 242 days.

(21) Appl. No.: 17/870,756

(22) Filed: Jul. 21, 2022

(65) Prior Publication Data

US 2023/0039364 A1 Feb. 9, 2023

(30) Foreign Application Priority Data

Jul. 22, 2021 (GB) .................................... 2110586

(51) Int. Cl.
| | |
|---|---|
| *G06T 5/73* | (2024.01) |
| *G06T 5/20* | (2006.01) |
| *G06T 5/70* | (2024.01) |
| *G06T 11/00* | (2006.01) |

(52) U.S. Cl.
CPC .................. *G06T 5/20* (2013.01); *G06T 5/70* (2024.01); *G06T 5/73* (2024.01); *G06T 11/001* (2013.01)

(58) Field of Classification Search
None
See application file for complete search history.

(56) References Cited

U.S. PATENT DOCUMENTS

2003/0016218 A1 1/2003 Zwicker et al.

OTHER PUBLICATIONS

Karacan et al., "Structure-Preserving Image Smoothing via Region Covariances", ACM, 2013. (Year: 2013).*
Greisen et al., "Analysis and VLSI Implementation of EWA Rendering for Real-Time HD Video Applications," IEEE Transactions on Circuits and Systems for Video Technology, vol. 22, 2012, pp. 1577-1589.
Greisen et al., "Spatially-Varying Image Warping: Evaluations and VLSI Implementations," International Conference on Intelligent Information Processing, IFIP Advances in Information and Communication Technology, vol. 418, 2013, 20th IFIP WG 10.5/IEEE, p. 68.
Zhu et al., "Restoration for weakly blurred and strongly noisy images," 2011 IEEE Workshop on Applications of Computer Vision, 2011,pp. 103-109.

* cited by examiner

*Primary Examiner* — Nicholas R Wilson
(74) *Attorney, Agent, or Firm* — Potomac Law Group, PLLC; Vincent M DeLuca

(57) ABSTRACT

An image processing method and an image processing unit for performing image processing determines a set of one or more filtered pixel values, wherein the one or more filtered pixel values represent a result of processing image data using a set of one or more filtering functions. A total covariance of the set of one or more filtering functions is identified. A refinement filtering function is applied to the set of one or more filtered pixel values to determine a set of one or more refined pixel values, wherein the refinement filtering function has a covariance that is determined based on the total covariance of the set of one or more filtering functions.

19 Claims, 8 Drawing Sheets

IMAGE PROCESSING USING FILTERING FUNCTION COVARIANCE

FIELD

The present disclosure relates to image processing.

BACKGROUND

Digital images attempt to represent continuous images using a finite set of pixel values at respective pixel positions. There are many different types of image processing techniques which produce images represented with pixel values. For example, a graphics rendering process (e.g. a rasterization or a ray tracing process) can be used to form computer-generated images, e.g. showing views of a scene comprising geometry representing objects in the scene.

Each pixel is at a point in the 2D image space of the image, but the value of each pixel generally represents a region of the continuous image that the pixel values are attempting to represent, where the region has non-zero area. In other words, each pixel has a footprint in image space and the pixel value should be some form of weighted average (e.g. represented mathematically by an integration kernel) of the image over its footprint (or "kernel support"). The term 'footprint' as used with respect to pixels does not necessarily refer to the physical shape of the pixel in a display device, but may refer to the area of a pixel filter used to construct the final pixel value for that pixel. If the footprints of the pixel values are too small (so that there are large gaps between the footprints) then artefacts can appear in the image. These artefacts may be caused by 'aliasing', and can result in shimmering or staircasing effects (or other objectionable effects) in the image. However, if the footprints of the pixel values are too large (so that they overlap to a great extent) then the image can appear blurry and/or the evaluation cost of the pixel values may become prohibitive.

Some existing approaches for reducing aliasing effects are super-sampling or multi-sample anti-aliasing (MSAA) in which rendered values are processed with a greater density of samples than the pixel density in the final image so that the final pixels can be determined by downsampling the rendered values. Some other existing approaches use temporal anti-aliasing filters where a sequence of images (or "frames") are generated of a scene, wherein pixel values over the sequence of frames can be combined to reduce the effects of artefacts such as aliasing. There are also post-processing approaches, wherein when an image has been generated a program runs which analyses the image and attempts to find artefacts in the image and reduce their effect, e.g. by blurring over aliased edges in the image.

However, the existing approaches generally do not completely remove the artefacts, and/or often significantly increase the computation workload for generating the images. For example, super-sampling approaches can, through increasing sampling density, double or quadruple the amount of work that is performed to render an image and post-processing approaches require additional render passes, incurring both memory and bandwidth overheads. Some hardware-accelerated approaches such as MSAA may limit the additional workload, but are more limited in the extent to which they remove artefacts (and tend to focus on particular problem areas).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided an image processing method comprising:
- determining a set of one or more filtered pixel values, wherein the one or more filtered pixel values represent a result of processing image data using a set of one or more filtering functions;
- identifying a total covariance of the set of one or more filtering functions; and
- applying a refinement filtering function to the set of one or more filtered pixel values to determine a set of one or more refined pixel values, wherein the refinement filtering function has a covariance that is determined based on the total covariance of the set of one or more filtering functions.

The covariances of the one or more filtering functions and of the refinement filtering function may be isotropic and may be represented as variances.

Said identifying the total covariance of the set of one of more filtering functions may comprise:
- identifying, for each of the one or more filtering functions, a respective individual covariance; and
- summing the one or more identified individual covariances.

Said applying a refinement filtering function to the set of one or more filtered pixel values may comprise applying a sharpening function to the set of one or more filtered pixel values to determine a set of one or more sharpened pixel values, wherein the covariance of the sharpening function may represent the negative of the total covariance of the set of one or more filtering functions.

The method may further comprise determining the covariance of the sharpening function by determining the negative of the total covariance of the set of one or more filtering functions.

Said applying a sharpening function to the set of one or more filtered pixel values may comprise: determining a sharpening matrix; and performing a convolution of the sharpening matrix with the set of one or more filtered pixel values.

The sharpening matrix may be a 3×3 matrix, a 3×1 matrix or a 1×3 matrix.

The total covariance of the set of one or more filtering functions may be below a target total covariance, and said applying a refinement filtering function to the set of one or more filtered pixel values may comprise applying a blurring function to the set of one or more filtered pixel values to determine a set of one or more blurred pixel values, wherein the covariance of the blurring function may represent the difference between the target total covariance and the total covariance of the set of one or more filtering functions.

Said determining a set of one or more filtered pixel values may comprise performing texture filtering, wherein the set of one or more filtered pixel values may represent a result of processing image data of a source image representing a texture using a set of filtering functions comprising one or more of: (i) a mipmap generation filtering function, (ii) a texture filtering function, (iii) an anisotropic filtering function, and (iv) a texture mapping function.

The mipmap generation filtering function may be a box filtering function. The texture filtering function may be a tent filtering function. The anisotropic filtering function may be a sum of taps function.

Said applying a refinement filtering function to the set of one or more filtered pixel values may comprise:
  extending texture coordinates for a primitive in a tile outside of one or both of: (i) a boundary of the tile, and (ii) a boundary of the primitive; and
  using the extended texture coordinates to apply the refinement filtering function to one or more of the filtered pixel values which correspond to one or more fragments of the primitive.

Said determining a set of one or more filtered pixel values may comprise performing a graphics rendering process to determine rendered pixel values, wherein the method may comprise, for each of the rendered pixel values:
  determining an indication of the total covariance of the one or more filtering functions used to render the pixel value; and
  applying a respective refinement filtering function to the rendered pixel value to determine a respective refined pixel value, wherein the refinement filtering function applied to the pixel value has a covariance that is determined based on the determined total covariance of the set of one or more filtering functions used to render the pixel value.

The method may further comprise storing indications of the total covariances for the rendered pixel values as one or more additional channels of data.

The indications of the total covariances for the rendered pixel values may be per-pixel indications.

The method may further comprise setting indicators for rendered pixel values to indicate whether they represent geometry boundaries or interior regions of geometry, wherein the refinement filtering functions for the respective rendered pixel values have covariances that may be determined based on the indicators that are set for the rendered pixel values.

The covariance of the refinement filtering function for a rendered pixel value may be larger if the indicator for the rendered pixel value indicates that the rendered pixel value represents a geometry boundary than if the indicator for the rendered pixel value indicates that the rendered pixel value represents an interior region of geometry.

The method may further comprise outputting the set of one or more refined pixel values.

The one or more filtering functions may be non-negative.

There is provided an image processing unit comprising:
  a processing module configured to determine a set of one or more filtered pixel values, wherein the one or more filtered pixel values represent a result of processing image data using a set of one or more filtering functions;
  a covariance identification module configured to identify a total covariance of the set of one or more filtering functions; and
  a filtering module configured to apply a refinement filtering function to the set of one or more filtered pixel values to determine a set of one or more refined pixel values, wherein the refinement filtering function has a covariance that is determined based on the total covariance of the set of one or more filtering functions.

The filtering module may be configured to apply a sharpening function to the set of one or more filtered pixel values to determine a set of one or more sharpened pixel values, wherein the covariance of the sharpening function may represent the negative of the total covariance of the set of one or more filtering functions.

The total covariance of the set of one or more filtering functions may be below a target total covariance, and the filtering module may be configured to apply a blurring function to the set of one or more filtered pixel values to determine a set of one or more blurred pixel values, wherein the covariance of the blurring function may represent the difference between the target total covariance and the total covariance of the set of one or more filtering functions.

The processing module may be configured to perform texture filtering, wherein the set of one or more filtered pixel values may represent a result of processing image data of a source image representing a texture using a set of filtering functions comprising one or more of: (i) a mipmap generation filtering function, (ii) a texture filtering function, (iii) an anisotropic filtering function, and (iv) a texture mapping function.

The processing module may be configured to perform a graphics rendering process to determine rendered pixel values, wherein the covariance identification module may be configured to determine, for each of the rendered pixel values, an indication of the total covariance of the one or more filtering functions used to render the pixel value, and wherein the filtering module may be configured to apply, to each of the rendered pixel values, a respective refinement filtering function to determine a respective refined pixel value, wherein the refinement filtering function to be applied to a rendered pixel value has a covariance that may be determined based on the determined total covariance of the set of one or more filtering functions used to render the pixel value.

The image processing unit may be configured to output the set of one or more refined pixel values.

There is provided an image processing unit configured to perform methods described herein.

The image processing unit may be embodied in hardware on an integrated circuit. There may be provided a method of manufacturing, at an integrated circuit manufacturing system, an image processing unit. There may be provided an integrated circuit definition dataset that, when processed in an integrated circuit manufacturing system, configures the system to manufacture an image processing unit. There may be provided a non-transitory computer readable storage medium having stored thereon a computer readable description of an image processing unit that, when processed in an integrated circuit manufacturing system, causes the integrated circuit manufacturing system to manufacture an integrated circuit embodying an image processing unit.

There may be provided an integrated circuit manufacturing system comprising: a non-transitory computer readable storage medium having stored thereon a computer readable description of the image processing unit; a layout processing system configured to process the computer readable description so as to generate a circuit layout description of an integrated circuit embodying the image processing unit; and an integrated circuit generation system configured to manufacture the image processing unit according to the circuit layout description.

There may be provided computer program code for performing any of the methods described herein. In other words, there may be provided computer readable code configured to cause any of the methods described herein to be performed when the code is run. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
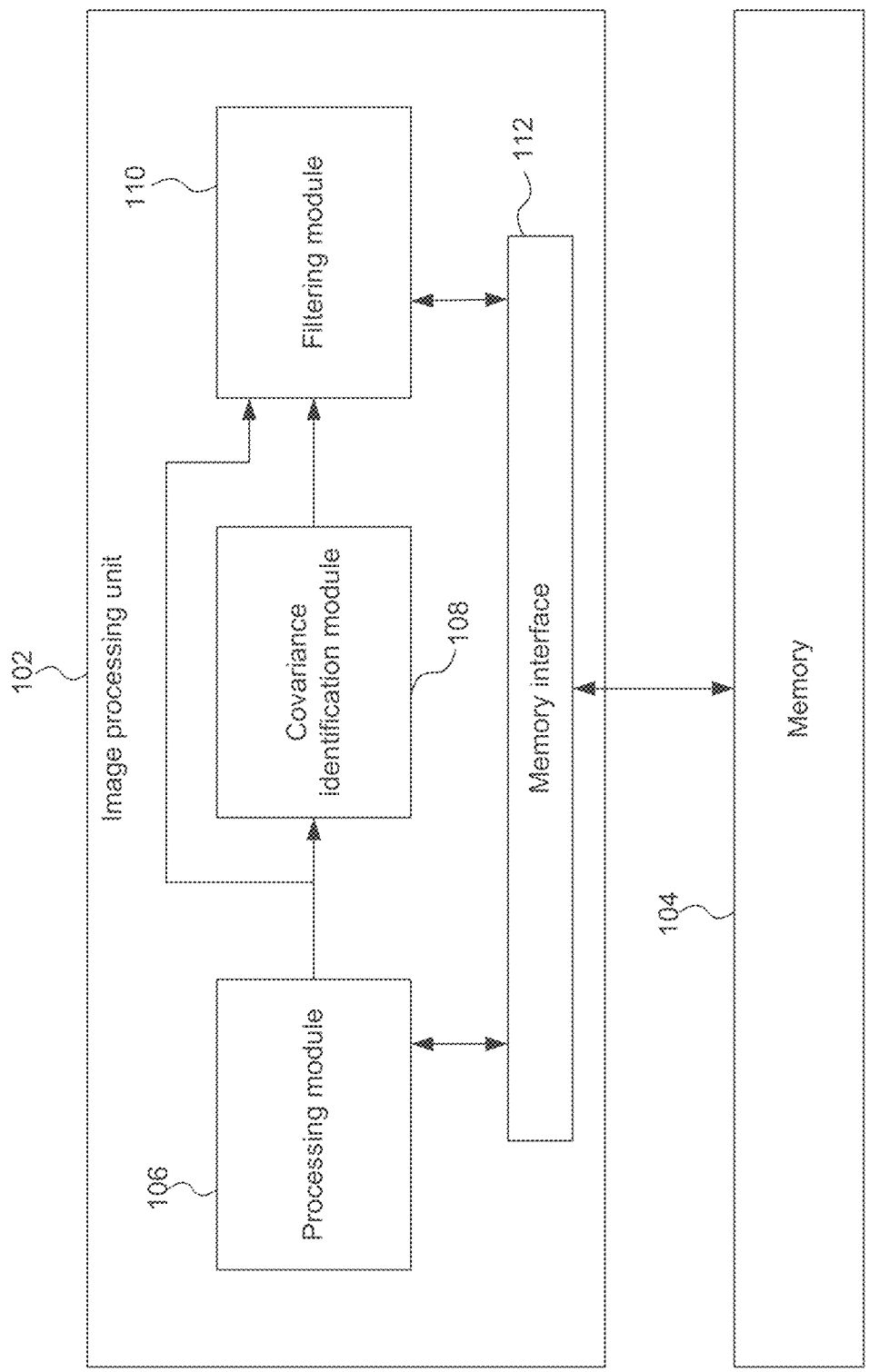
FIG. 1 illustrates an image processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

When a discrete set of pixel values are determined to represent a continuous image, some information will be lost, e.g. details at spatial frequencies above the Nyquist frequency. After a set of pixel values has been determined, some systems may attempt to improve the quality of the image by applying some post-processing, e.g. by applying a sharpening or a blurring filtering process to the image in a fairly ad-hoc manner.

In contrast, in the examples described herein, the image processing method is conceptually split into two filtering stages: (i) a discretization filtering stage, and (ii) a refinement filtering stage. The generation of a set of pixel values in the discretization filtering stage can be considered to represent a result of processing image data using a set of one or more filtering functions, such that the pixel values may be referred to herein as filtered pixel values. Each filtered pixel value can be considered to be associated with a footprint within a continuous image that is being represented by the set of filtered pixel values. The size (or "width" or "scale") of the footprint for a filtered pixel value can be described in terms of a covariance of the set of one or more filtering functions. When the footprint is isotropic the covariance can be described as a variance, but more generally, the footprint may be anisotropic so the covariance is generally used. A filtering function can be described with a filtering kernel. The filtering functions of the set of one or more filtering functions described herein are non-negative, which allows the (co)variance to be unambiguously associated with the width of the footprint (a function with negative portions will cancel out positive positions in the covariance calculation, which can, for example, lead to a (co)variance of zero for finite width kernels). Non-negative kernels are naturally associated with probability distributions and are well suited to describing physical processes (such as the angular distribution of photons impinging on a detector), which may in turn form the basis of rendering simulation models, such as stochastic sampling in ray tracing. A person skilled in the art would be familiar with different types of non-negative filters, such as box filters, tent filters and Gaussian filters to give just a few examples. In some applications, it may be advantageous to allow some amount of negativity in the filtering kernels, but the benefit of the methods described herein is primarily targeted at non-negative kernels. There is a computational benefit from the separation of the kernel into a discretization filter applied on a continuous image and a refinement filter acting on a framebuffer, as described herein. In particular, if discretization filter and the refinement filter were pre-combined, the workload would be multiplied (rather than added, as is achieved by separating them).

When multiple filtering functions are applied to a set of pixel values, the total filtering applied can be described as a convolution of the individual filtering functions. When individual filtering functions are convolved with each other, their individual covariances are added to give the total covariance of the total filtering. In other words, covariance is additive when filtering functions are convolved. This allows the discretization filtering stage to be decomposed into a series of (potentially simpler) filtering operations.

In examples described herein, when a set of one or more filtered pixel values have been determined representing a result of processing image data using a set of one or more (non-negative) filtering functions, a total covariance of the set of one or more filtering functions is identified. Then a refinement filtering function is applied to the set of one or more filtered pixel values to determine a set of one or more refined pixel values. The covariance of the refinement filtering function is determined based on the total covariance of the set of one or more filtering functions. The total covariance of the set of one or more filtering functions may be determined in a programmatic fashion, or according to some fixed assumptions about the graphics pipeline.

As a first example, the refinement filtering function may be a sharpening function which is applied to the set of one or more filtered pixel values to determine a set of one or more sharpened pixel values, where the (co)variance of the sharpening function represents the negative of the total (co)variance of the set of one or more filtering functions. This can be understood in terms of the spectrum of the filtering kernel. The sampling theorem tells us that the multiplication of any signal with a train of periodic impulses (i.e. the reduction of a signal/function to a set of periodic samples) will transform the signal spectrum into a set of shifted copies of itself (offset by multiples of the sampling rate or twice the Nyquist wavelength). The mathematical origin of aliasing therefore consists in the degree of overlap between adjacent copies (we cannot disentangle them after information about the original signal has been lost) and the general task of an anti-aliasing filter is to minimise this overlap by attenuating higher frequencies (such that it is a low pass filter). For a non-negative kernel, the spectral width (again in terms of covariance) is bounded below by the inverse spatial width (this is the Heisenberg uncertainty principle in action) so we generally need a covariance proportional to the sampling width to provide adequate antialiasing. However, to avoid excessive blurring we also wish to preserve the lower frequencies that are largely untouched by aliasing and contribute to the perceived fidelity of the final image (note that the exact trade-off depends on the optical properties of the system processing the image, including e.g. the display device and the human observer). In filtering parlance, we have the (sometimes competing) aims of making the passband as close to unity as possible and the stopband as close to zero as possible. It is generally recognised that non-negative filtering kernels, while often possessing good or adequate anti-aliasing properties, do not perform well in the pass-band (i.e. they tend to blur images excessively). The reason for this is that the second derivative of the spectrum at the origin is in fact the negative of the filter's spatial variance and so the spectrum of any kernel with a positive variance will tend to fall away from unity as the frequency increases. However, thanks to the additive property of covariance, we can, by convolving our filtering kernel by any other kernel with negative variance, produce a composite kernel with zero variance and a flatter (i.e. better) frequency response in the passband. This can be achieved by setting the (co)variance of the sharpening function to be the negative of the total (co)variance of the set of one or more filtering functions in the discretization filtering stage. With more information about the composite kernel, further refinement to the passband can be made, but this would require a larger refinement kernel (operating over more filtered pixels) and care must be taken to trade off preservation of desired frequencies against amplification of unwanted aliased frequencies (blurring is useful for masking imperfections). The sinc filter, for example, which is the ideal anti-aliasing filter for a band-limited signal has a frequency response of one all the way up to the Nyquist limit (and zero thereafter) but it has an infinite support (i.e. kernel width). In addition, if the signal/function is expected to undergo symmetry transformations (such as rotations and scaling as is ubiquitous in 3d graphics), instability is introduced by excessive preservation of frequencies near the Nyquist limit such that a more tempered solution (as afforded by just applying the covariance correction) may often be preferable, not to mention the general compounding of error in the computed pixel values produced by excess sharpening.

As a second example, the total covariance of the set of one or more filtering functions may be below a target total covariance, and the refinement filtering function may be a blurring function which is applied to the set of one or more filtered pixel values to determine a set of one or more blurred pixel values, where the covariance of the blurring function represents the difference between the target total covariance and the total covariance of the set of one or more filtering functions. This example may find application where an initial discretization filter is of poor quality (e.g. in MSAA filtering of edges of rendered polygons) and it is considered better to reduce aliasing than augment passband frequencies.

Some examples described herein use an unsharpened render target. A "render target" may be referred to as a "framebuffer", and may for example be a collection of memory attachments and states that a render pass renders to. The render target may write to one or more buffers in memory 104 or to one or more buffers in on-chip memory (e.g. a buffer that is part of the image processing unit 102).

In other words, a render target is a destination for data processed by the image processing unit 102. In these examples, a render target (e.g. a framebuffer object) has one or more additional channels (e.g. one channel for isotropic variance or up to three channels to allow for anisotropic covariance) for data indicating the (co)variance for a set of one of more fragments of the render target. Where the set of one or more fragments is just a single fragment, the additional channel(s) store per-fragment indications to indicate the (co)variances for the individual fragments (i.e. on a per-fragment basis). In examples in which the set of one or more fragments is a plurality of fragments, e.g. a block of fragments, such as a 2×2 or 4×4 block of fragments, the additional channel(s) store per-block indications to indicate the (co)variances for the blocks of fragments (i.e. on a per-block basis). As described herein, there is a justified decomposition of image reconstruction into (i) a discretization filtering stage, and (ii) a refinement filtering stage. This separability is leveraged to reduce the sampling/filtering workload. In this way, rather than rendering values to some intermediate target and performing additional rendering passes, a simple constrained kernel is executed on the values rendered into an unsharpened render target to thereby apply the refinement (e.g. sharpening or blurring) based on the data indicated in the additional channel(s). The data indicating the (co)variance for the fragments in the unsharpened render target that is stored in the additional channel(s) may be referred to as "variance sideband data". The variance sideband data may be exposed to a shader program in a programmatic fashion to indicate the total (co)variance for the fragments, and the shader program can use this information however it sees fit, e.g. by applying a sharpening function as described herein with a (co)variance that is the negative of the total (co)variance of the fragments. As should be apparent already, different fragments can have different total (co)variances, so the different indications in the (co)variance sideband data can be different for different fragments, such that different processing (in the refinement stage) can be applied to different fragments in accordance with their respective indications in the (co)variance sideband data.

FIG. 1 illustrates an image processing system. The image processing system comprises an image processing unit 102 and a memory 104. The image processing unit 102 comprises a processing module 106, a covariance identification module 108, a filtering module 110 and a memory interface 112. The components of the image processing unit 102 shown in FIG. 1 may be implemented in hardware (e.g. fixed function circuitry), software, or a combination thereof. Furthermore, it is noted that the boundaries between different components may be different in different implementations. For example, in some implementations the covariance identification module 108 may be implemented as part of the processing module 106 or as part of the filtering module 110, and in some implementations the filtering module 110 may be implemented as part of the processing module 106.

Figure 2:
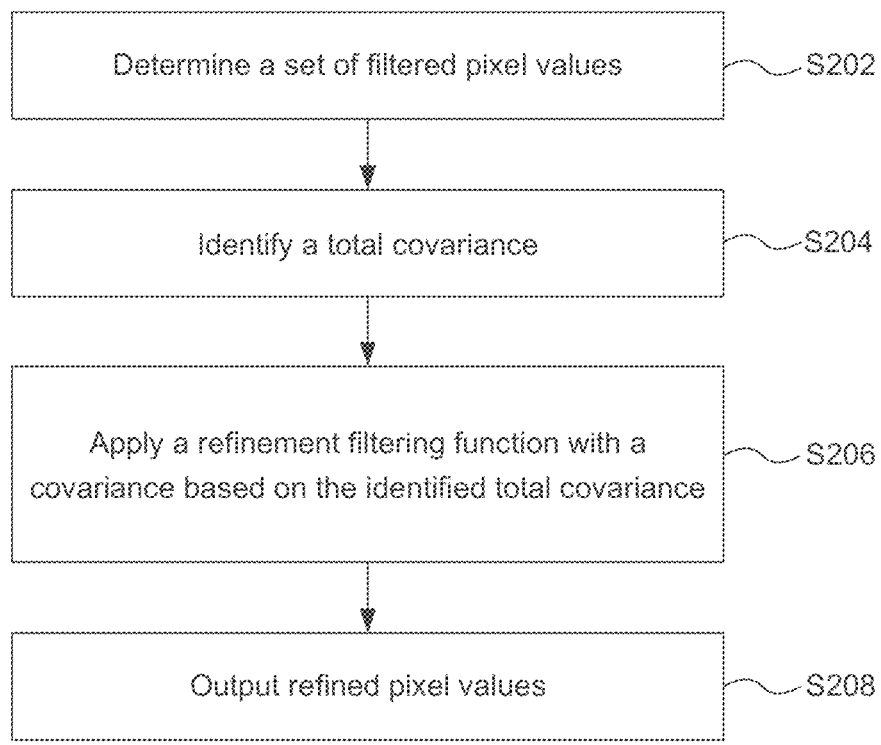
FIG. 2 is a flow chart for an image processing method.

FIG. 2 is a flow chart for an image processing method. In step S202 the processing module 106 determines a set of one or more filtered pixel values. As described in more detail below, this may involve performing texture filtering or performing a graphics rendering process to give two examples. The one or more filtered pixel values represent a result of processing image data using a set of one or more filtering functions. In some examples, the one or more filtering functions are non-negative which means that the weights in their kernels are all n. In some other examples, some amount of negativity may be allowed in the filtering kernels, but the benefit of the methods described herein is primarily targeted at non-negative kernels.

The set of one or more filtered pixel values may represent an image or part of an image. The set of one or more filtered pixel values is provided from the processing module 106 to the covariance identification module 108 and to the filtering module 110.

In step S204 the covariance identification module 108 identifies a total covariance of the set of one or more filtering functions. It is noted that the covariance may be a variance (e.g. in an isotropic example), but more generally, the covariance can allow for anisotropic examples. For example, in step S204 the covariance identification module 108 can identify, for each of the one or more filtering functions, a respective individual covariance, and then sum the one or more identified individual covariances to determine the total covariance of the set of one or more filtering functions. As described above, covariance is additive when filtering functions are convolved. An indication of the total covariance of the set of one or more filtering functions may be provided from the covariance identification module 108 to the filtering module 110. In some examples, more than one indication of the total covariance is provided. For example, per-pixel indications of total covariance may be provided by the covariance identification module 108.

It is noted that the covariance identification module 108 may be implemented as part of the processing module 106. The processing module 106 processes data to determine the set of one or more filtered pixel values (e.g. pixel values written into a render target). The covariance identification module 108 may determine covariance sideband data, e.g. as an additional channel of data, to represent a covariance map that contains an indication of the total covariance for each of the rendered pixel values. Each of the indications of total covariance determined by the covariance identification module 108 may be represented with a small amount of data, e.g. only 2 bits, and/or may be a float or fixed point continuous value within some range. In another example, there may be three channels to represent the covariance (e.g. as a 2×2 symmetric matrix) on a per-fragment basis.

The filtering module 110 receives the one or more filtered pixel values (e.g. by reading them from a render target, or by receiving them from the processing module 106 as shown in FIG. 1). The filtering module 110 also receives the indication(s) of the total covariance(s) (e.g. by reading them from an additional channel stored in the render target, or by receiving them from the covariance identification module 108 as shown in FIG. 1). In step S206 the filtering module 110 applies a refinement filtering function to the set of one or more filtered pixel values to determine a set of one or more refined pixel values. As described above, the covariance of the refinement filtering function is determined based on the total covariance of the set of one or more filtering functions as identified by the covariance identification module 108. The refinement filtering function may be a sharpening function or a blurring function or may leave a pixel unaltered (e.g. if the pixel already represents the best reconstruction or if there are factors that may suggest sharpening and blurring cancel each other out). As mentioned above, where there is more than one filtered pixel value (e.g. where multiple pixel values are rendered into an unsharpened render target), each pixel may have a respective (e.g. different) covariance associated with it. Per-pixel indications of the different covariances may be represented in the covariance sideband data, i.e. in a covariance map. The filtering module 110 can apply a respective (e.g. different) refinement filtering function to each of the filtered pixel values in accordance with the per-pixel indications of the different covariances, to thereby determine the refined pixel values.

In some examples, the covariances of the one or more filtering functions and of the refinement filtering function are isotropic, such that the covariances are represented as variances.

In step S208 the image processing unit 102 outputs the set of one or more refined pixel values. For example, the filtering module 110 may provide the refined pixel values to the memory interface 112 which can then send the refined pixel values to the memory 104 for storage therein. In other examples, the refined pixel values may be output from the image processing unit 102 to a display so that the refined pixel values can be displayed, e.g. to a user. In some examples, the refined pixel values may be stored in a store (e.g. a cache) on the image processing unit 102 and/or the refined pixel values may be passed from the filtering module 110 to the processing module 106 so the processing module 106 can process the refined pixel values. It is noted that the method shown in FIG. 2 outputs refined pixel values. This is in contrast to other approaches which involve writing filtered pixel values to an intermediate buffer and then running a post-processing stage for the refinement before writing the final pixel values to a final buffer (e.g. for outputting the final pixel values to a display or to memory).

As mentioned above, in some examples, the processing module 106 performs texture filtering to determine a set of one or more filtered pixel values. In computer graphics, texturing is frequently used to add surface detail to objects within a scene to be rendered. Textures typically represent continuous images and are typically stored as images with discrete pixel values (which may be referred to as "texel" values). A texture can be accessed to return a colour value for a pixel of an image being processed which shows a surface to which the texture is applied. To obtain a texture colour value for a pixel, the values of multiple texels of the texture may be sampled, and the sampled texel values may then be filtered to obtain a final texture value for the pixel. Typically a single pixel of an image being rendered does not map exactly to a single texel of the texture due to the projection of the texture onto 3D geometry within the image. For example, for textured pixels depicting a relatively close view of the texture, each pixel may be associated with a footprint which maps onto a relatively small region of a texture, e.g. covering zero or one texel, whereas for textured pixels depicting a relatively far view of the texture, each pixel may be associated with a footprint which maps onto a relatively large region of a texture, e.g. covering many (e.g. two or more) texels.

One approach to performing texture resampling is through mipmaps. A texture stored as a mipmap comprises a sequence of images, each of which is a progressively lower resolution representation of a base texture. Mipmaps are used to increase the speed of rendering by performing some of the resampling of the texture off-line. For example when a texture is created, the creator of the texture may form the different images of the mipmap, e.g. by progressively filtering a source image with a 2×2 box filter such that the image at each mipmap level is half the width and half the height of the image at the preceding mipmap level. Each of the image in the mipmap may be referred to as a 'MIP map level', or 'level of detail' (LOD) and each is a representation of the same base texture, but at a different resolution.

To render an image using a MIP map, trilinear filtering may be used. Trilinear filtering comprises a combination of two bilinear filtering operations followed by a linear interpolation (or blend). To render an image at a particular resolution (or level of detail) according to a trilinear filtering approach, bilinear filtering is used to reconstruct a continuous image from each of the two closest MIP map levels (i.e. the one at a higher resolution than the required resolution and the one at a lower resolution than the required resolution) and then linear interpolation (or blending) is used to produce an image at the intermediate, and required, resolution.

In some situations, anisotropic texture filtering may be performed. Anisotropic texture filtering recognises that the sampling rate of the texture, which depends on the mapping from screen-space (in which the image is depicted and the pixel coordinates defined) to texture space (in which the texture is depicted and the texel coordinates defined), is a function of the direction of travel in screen space. In other words, the optimal texture sampling rate may be different along different directions of travel, or axes, in screen space. When this is the case, the mapping between screen space and texture space may be said to be anisotropic. An example of an anisotropic mapping is the 3D projection of planar texture surfaces near the horizon, or any other situation in which a texture is applied to a surface in the scene which is significantly angled away from the viewpoint.

Figure 3:
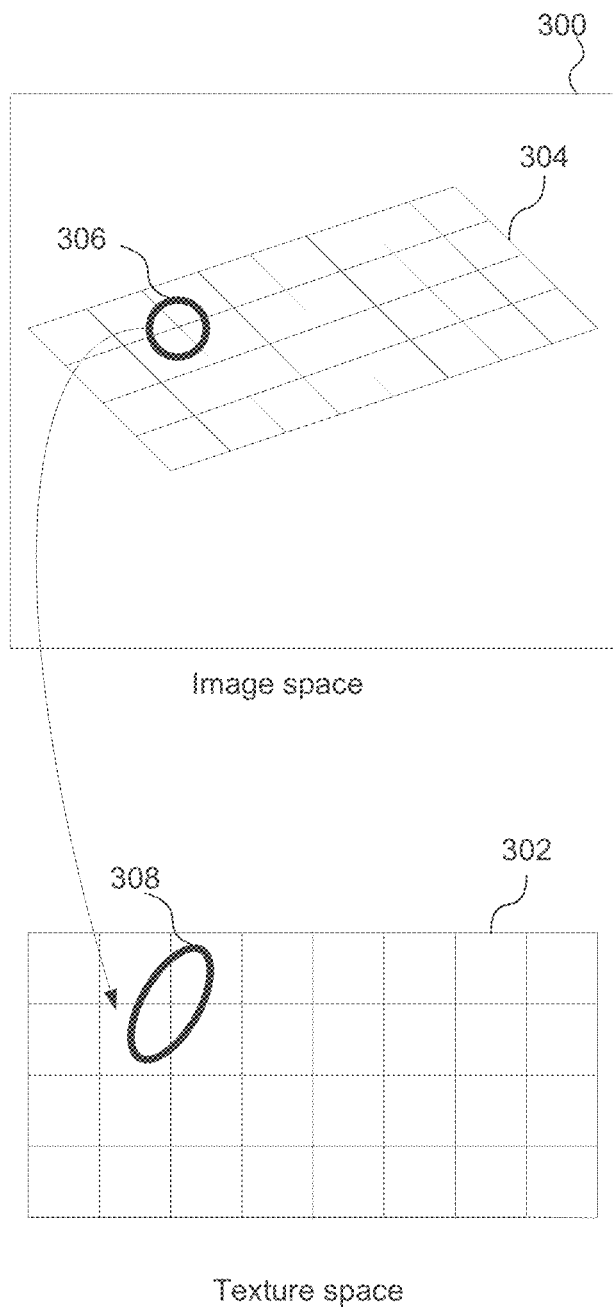
FIG. 3 shows a schematic illustration of a mapping of a sampling kernel between screen space and texture space.

For anisotropic texture mappings, a sampling kernel in texture space mapped to a pixel in screen space is elongated along a certain axis in texture space, with the direction of this axis being dependent on the mapping between screen space and texture space. This is illustrated schematically in FIG. 3, which shows an image 300 formed of pixels having coordinates defined in image space, and a texture 302 formed of texels having coordinates defined in texel space. Image 300 includes an object 304 having surface detail specified by the texture 302, i.e. the texture 302 is mapped to the surface of the object 304. Remaining objects within the image 300 have been omitted for the purposes of clarity. Object 304 is at an oblique viewing angle within the image 300. As mentioned above, if a texture is applied to geometry which is at an oblique angle relative to the viewing direction, then an isotropic footprint for a pixel in image space maps to an anisotropic footprint in texture space. Consequently, the shape of the footprint of a texture-mapped pixel within the image 300 is not maintained in the mapping to texture space. Numeral 306 denotes the pixel footprint in image space, which is circular, and numeral 308 denotes the corresponding pixel footprint in texel space. It can be seen that the footprint has been elongated in texture space to form an ellipse such that it is anisotropic. In general, the mapping of a pixel with a circular footprint in image space to texture space can be approximated by an ellipse, insofar as the texture mapping itself can be approximated by an affine mapping at the pixel's origin. Here, it is again noted that the term 'footprint' as used with respect to pixels does not necessarily refer to the physical shape of the pixel in a display device, but may refer to the area of a pixel filter used to construct the final pixel value for that pixel. The pixel's footprint in texture space may therefore be said to be equivalent to the sampling kernel in texture space for the pixel; i.e. the footprint in texture space identifies the texels to be sampled and filtered to form the texture colour value for the pixel.

A texture represents a source image (e.g. a continuous image), and the process of texture filtering results in a set of one or more filtered pixel values (in image space) representing the appearance of a surface to which the texture has been applied. The process of texture filtering may use a set of filtering functions comprising one or more of: (i) a mipmap generation filtering function, (ii) a texture filtering function, (iii) an anisotropic filtering function, and (iv) a texture mapping function.

Figure 4:
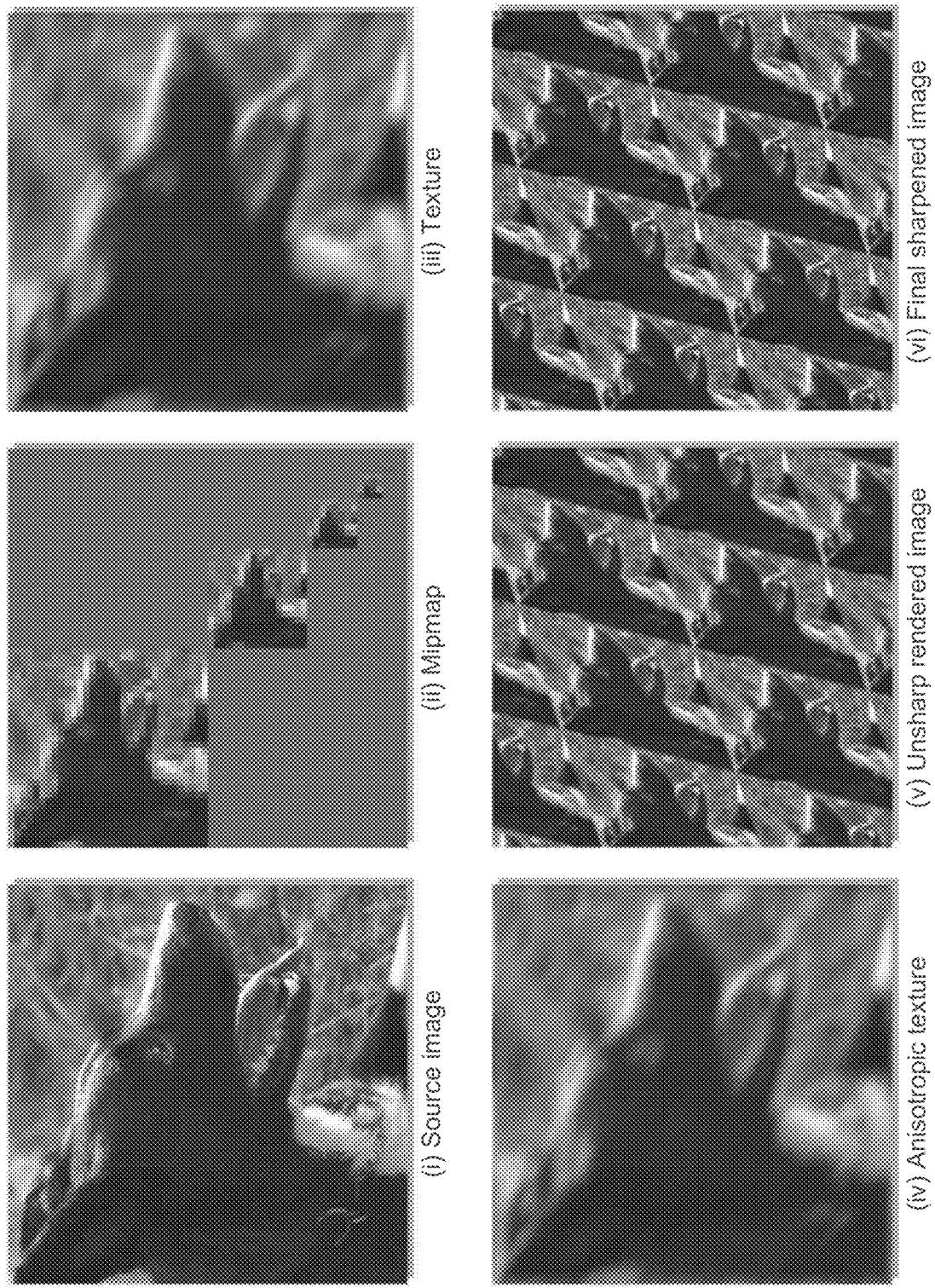
FIG. 4 shows example images representing different stages of a texturing process.

For example, FIG. 4(i) shows a source image. A mipmap generation filtering function is used to generate the images of the mipmap as shown in FIG. 4(ii). The mipmap generation filtering function may be a box filtering function, which may be applied to the source image. As mentioned above, the mipmap generation may be performed by a creator of the texture at a time before the time at which the texture is to be used for rendering an image. For example, the mipmap representing the texture may be provided to an image processing system (e.g. a graphics processing unit) and stored in a memory (e.g. memory 104) of the image processing system.

A texture filtering function is used to generate a representation of the texture (as shown in FIG. 4(iii)) at a particular level of detail using the images of the mipmap. The texture filtering function may be a tent filtering function, e.g. a trilinear filtering function, which may be applied to one or more images of the mipmap.

An anisotropic filtering function is used to generate a representation of the texture (as shown in FIG. 4(iv)) with some anisotropy in the levels of detail. The anisotropic filtering function may be a sum of taps function, which may be applied to the representation of the texture shown in FIG. 4(iii). For example, a weighted sum of a plurality of the texels of the representation of the texture shown in FIG. 4(iii) can be used to determine the anisotropic representation of the texture shown in FIG. 4(iv) wherein the weights that are used and the locations of the texels that are summed can be controlled so as to control the anisotropic ratio and the direction of anisotropy which is introduced by the anisotropic filtering function.

A texture mapping function is used to map the representation of the texture from the texture space onto a surface of geometry in image space, the result of which is shown in FIG. 4(v) labelled "unsharp rendered image".

Therefore the pixel values in the unsharp rendered image represent a result of processing image data (e.g. processing the source image) using a set of one or more filtering functions. The set of filtering functions are applied in a sequence such that a filtering function in the sequence acts upon the result of the preceding filtering function in the sequence. The overall effect can be interpreted as a convolution of the one or more filtering functions.

As described above, a filtering function is represented with a filtering kernel, which is defined as a real function $f(x)$ over an N dimensional image plane, where x is an N dimensional vector. The covariance of the filtering function (denoted $\overline{xx^T}_f$) is given as:

$$\overline{xx^T}_f = \frac{1}{|f|} \int dx^N f(x)(x - \bar{x}_f)(x - \bar{x}_f)^T \qquad (1)$$

where the symbol $\bar{x}_f$ represents the mean of the filtering kernel and is given as:

$$\bar{x}_f = \frac{1}{|f|} \int dx^N f(x) x \qquad (2)$$

And the symbol $|f|$ represents the pseudonorm (when positive) and is given as:

$$|f| = \int dx^N f(x) \qquad (3)$$

The filtering kernels of the filtering functions described herein are normalised, so $|f|=1$, and they have mean values of zero, i.e. $\bar{x}_f=0$. Furthermore, the filtering functions that are used to determine the unsharp rendered image in the texture filtering process described as an example with reference to FIG. 4 are non-negative, i.e. $f(x) \geq 0$ for all valid values of x.

The description provided herein refers to the "covariance", and it is to be understood that the term "variance" may be used instead when terminology is been used more loosely or when the covariance is restricted to having one dimension (e.g. for isotropic scales). A "variance" is an example of a "covariance".

The individual covariances of the different filtering functions used to get from the source image (e.g. shown in FIG. 4(*i*)) to the unsharp rendered image (e.g. shown in FIG. 4(*v*)) can be identified using equation (1), and then the individual covariances can be summed to determine a total covariance of the set of filtering functions.

Then a sharpening function can be applied by the filtering module 110 to the unsharp rendered image shown in FIG. 4(*v*) to determine the final sharpened image shown in FIG. 4(*vi*). The covariance of the sharpening function is determined (e.g. by the filtering module 110 or by the covariance identification module 108) to be the negative of the total covariance of the set of filtering functions. In other words, the covariance of the sharpening function may be calculated by multiplying the total covariance of the set of filtering functions by −1. A kernel with weights representing the sharpening filter is determined so that it has the appropriate covariance. The kernel may also be normalised, and may have a mean value of zero. In this way, a sharpening matrix is determined. As an example, the sharpening matrix may be a 3×3 matrix (which is the minimal size for a covariance matrix with 3 non-zero entries and zero mean), but in other examples the sharpening matrix may have a different size and/or shape (e.g. 1×3, 3×1, 5×5 etc.). The filtering module 100 performs a convolution of the sharpening matrix with the pixel values of the unsharp rendered image to determine the final sharpened image.

As described above, by setting the covariance of the sharpening filter to be the negative of the total covariance of the set of filtering functions that have generated the filtered pixel values, the sharpening filter maintains detail in the pixel values that has been represented faithfully but filters out portions of the image that are not represented faithfully. For example, as described above, when implementing filtering, there are (sometimes competing) aims of making the passband as close to unity as possible and the stopband as close to zero as possible. It is generally recognised that non-negative filtering kernels, while often possessing good or adequate anti-aliasing properties, do not perform well in the pass-band (i.e. they tend to blur images excessively). The reason for this is that the second derivative of the spectrum at the origin is in fact the negative of the filter's spatial covariance and so the spectrum of any kernel with a positive covariance will tend to fall away from unity as the frequency increases. However, thanks to the additive property of covariance, we can, by convolving our filtering kernel by any other kernel with negative covariance, produce a composite kernel with zero covariance and a flatter (i.e. better) frequency response in the passband. This can be achieved by setting the covariance of the sharpening function to be the negative of the total covariance of the set of one or more filtering functions in the discretization filtering stage.

Figure 5:
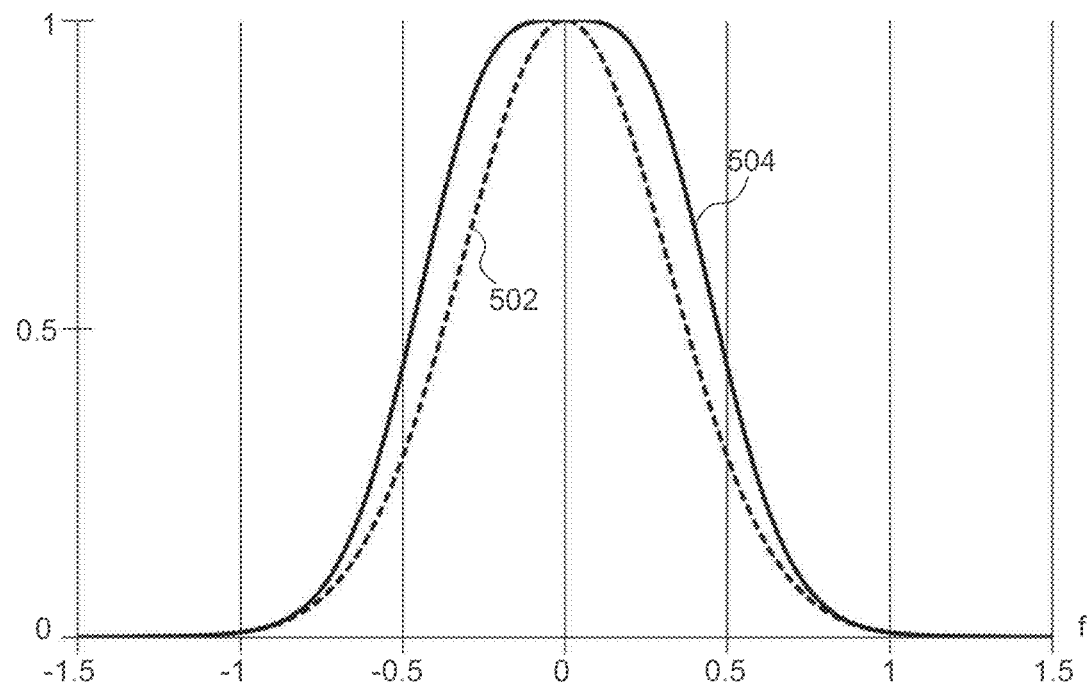
FIG. 5 shows a first example of the effect of using a sharpening filter on an ideal filtering function.

FIG. 5 shows a first example of the effect of using a sharpening filter on an ideal filtering function. The curve 502 (shown with the dashed line in FIG. 5) represents the spectrum of a one-dimensional Gaussian kernel with a variance of ¼ sample spacing (in the spatial domain). It has a peak at the origin of 1 (such that it leaves the DC component of any filtered function unchanged, as is implied by the normalisation of the kernel). The horizontal axis (f) is given in units of cycles per sample spacing such that the Nyquist frequency is ½. The Gaussian spectrum is thus described by the expression:

$$\exp\left(-\frac{1}{2}(\pi f)^2\right)$$

The Gaussian is the ideal discretization filter in the sense that it minimises the spectral width (variance) for a given spatial width such that (with appropriate windowing to generate a finite support) it can deliver a near-optimal degree of anti-aliasing for a fixed width finite filtering budget. It also happens to be separable and closed under affine mapping and convolution and (by virtue of the central limit theorem) the limit of repeated convolution of other kernels and so is the archetypal filter to consider in the context of texture mapping. It can be seen from the graph that some spectral leakage will result from the area under the curve above the Nyquist limit, but this can be mitigated by using a wider kernel (at more computational expense). However, it should be noted that the curve 502 already exhibits significant attenuation within the passband and a wider (better anti-aliased) kernel would further exacerbate this problem. The curve 504 (shown with the solid line in FIG. 5) depicts the Gaussian kernel after a kernel with a variance of −¼ has been applied. In particular, the (one-dimensional in this example, but easily extended to two dimensions as a separable filter) kernel $$-\frac{1}{8}\delta(x+1) + \frac{5}{4}\delta(x) - \frac{1}{8}\delta(x-1)$$

where $\delta(x)$ is the Dirac delta function used to sample at the pixel locations, is convolved with the Gaussian. The spectrum of the curve 504 is thus given (thanks to the convolution theorem mapping convolution to multiplication in the spectral domain) by $$\exp\left(-\frac{1}{2}(\pi f)^2\right)\left[1 + \frac{1}{4}(1 - \cos 2\pi f)\right]$$

The composite kernel has zero variance and it can be seen from the graph that the passband response is significantly improved (i.e. the curve 504 stays at or near a value of 1 for a greater range of values for f compared to the curve 502, meaning that the passband (between f=−0.5 and f=0.5) is not so attenuated) with relatively minor amplification of the stopband (below f=−0.5 and above f=0.5).

Figure 6A:
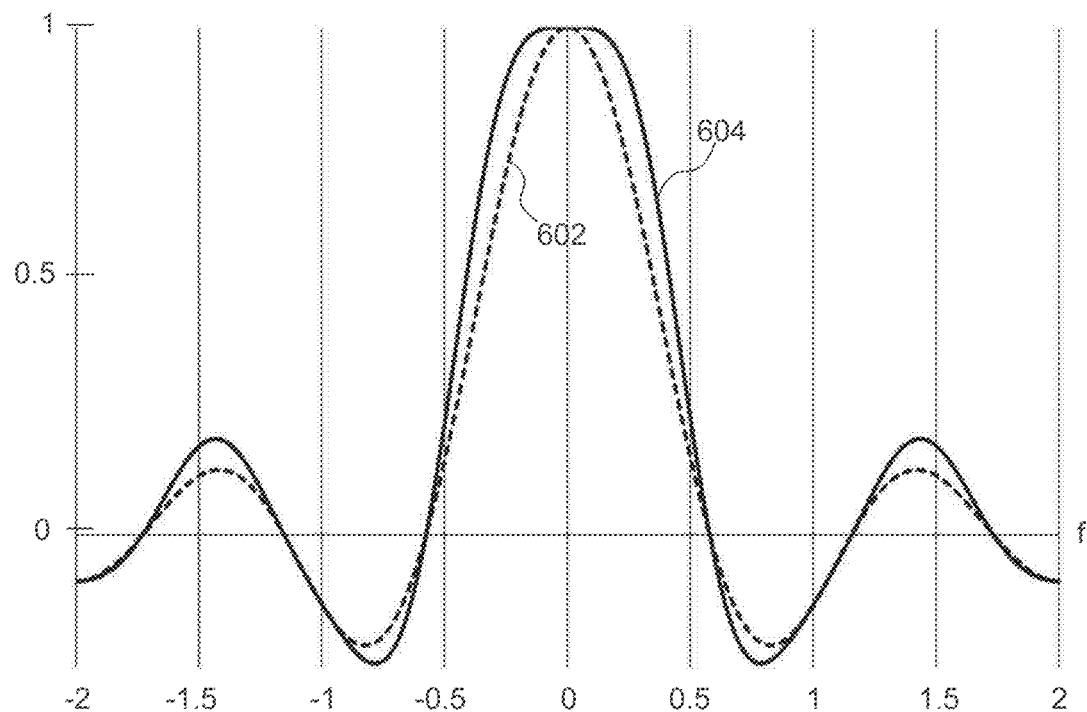
FIG. 6a shows a second example of the effects of using a sharpening filter on a second filtering function.
Figure 6B:
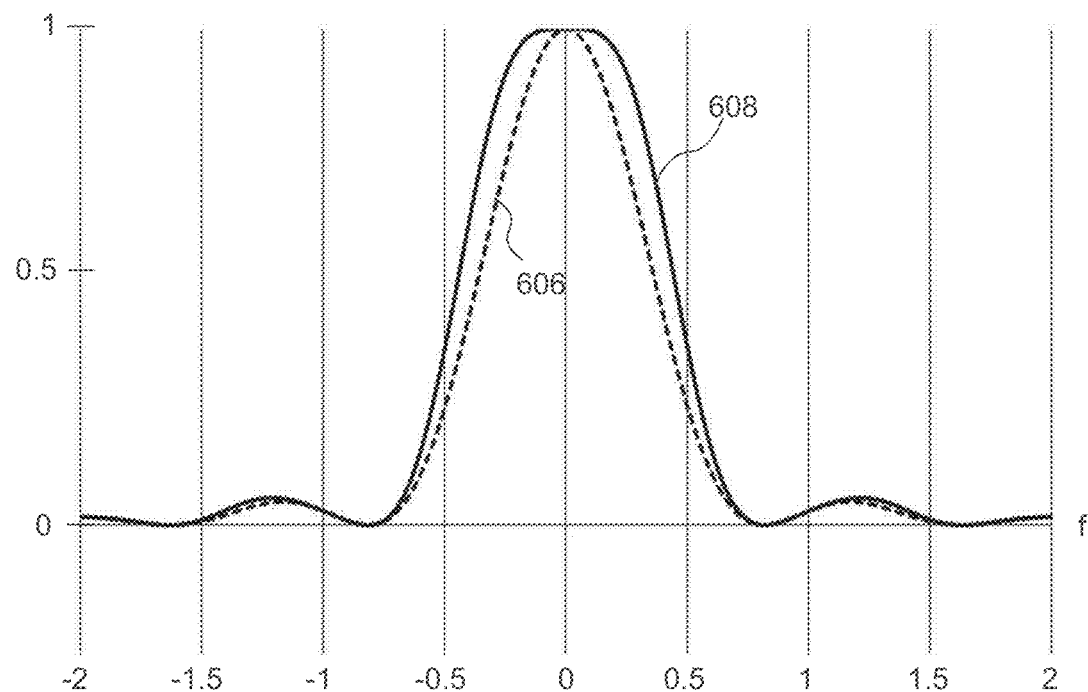
FIG. 6b shows a third example of the effects of using a sharpening filter on a third filtering function.
Figure 6C:
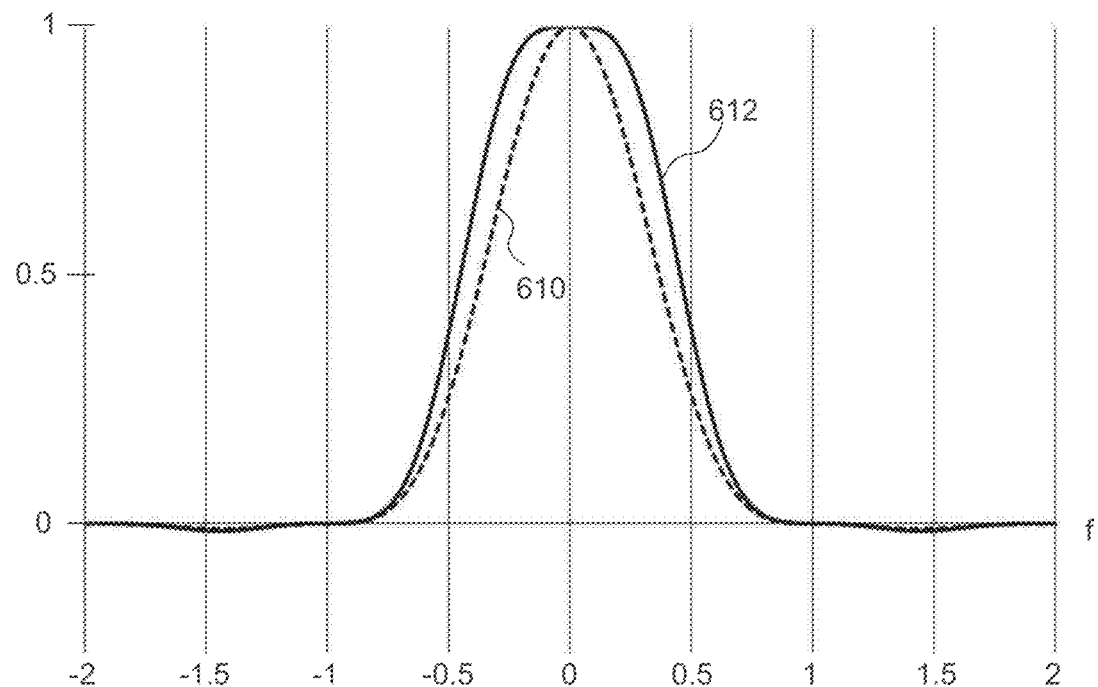
FIG. 6c shows a fourth example of the effects of using a sharpening filter on a fourth filtering function.

FIGS. 6*a* to 6*c* show further examples of the effects of using a sharpening filter on more generalised sets of filtering functions. The curve 602 (shown with the dashed line in FIG. 6*a*) represents the spectrum of a box filter (i.e. a sinc function) and the curve 604 (shown with the solid line in FIG. 6*a*) represents its sharpened counterpart. The curve 606 (shown with the dashed line in FIG. 6*b*) represents the tent filter and the curve 608 (shown with the solid line in FIG. 6*b*) represents its sharpened counterpart. The curve 610

(shown with the dashed line in FIG. 6c)represents the next cardinal B-spline and the curve 612 (shown with the solid line in FIG. 6c) represents its sharpened counterpart. The tent filter (represented in FIG. 6b) is a box filter convolved with itself and the next (i.e. the third) B-spline (represented in FIG. 6c) is a box filter convolved with itself twice, which is rapidly approaching the shape of the Gaussian filter. Although each of these examples have wildly disparate stopband responses (with the box filter being the worst example), it is clear from the graphs that the passband responses are very similar and dominated by the matching variance of each kernel. Similarly one can see that the sharpened response in the passband is largely insensitive to the higher order moments of the underlying kernel:

$$\operatorname{sinc}^o\left(\sqrt{\frac{3}{0}}\pi f\right)\left[1 + \frac{1}{4}(1 - \cos 2\pi f)\right]$$

Here 0 gives the order of cardinal B-spline; it is 1 for the box filter, 2 for the tent and so on. In the case of the box filter, the degree of amplification of undesirable stopband frequencies is more pronounced than the other cases, but it can be shown that the benefit to the passband outstrips this on the whole and it can thus be generally argued (for reasonable discretization variances, of which ¼ is a typical compromise [½ has a much higher quality potential but incurs much more overhead for both discretization and refinement, the latter stage needing to tap into higher moments to recover the much more aggressively filtered passband]) that the refinement stage is (almost) always beneficial independent of the exact shape of the preceding filters.

Figure 7:
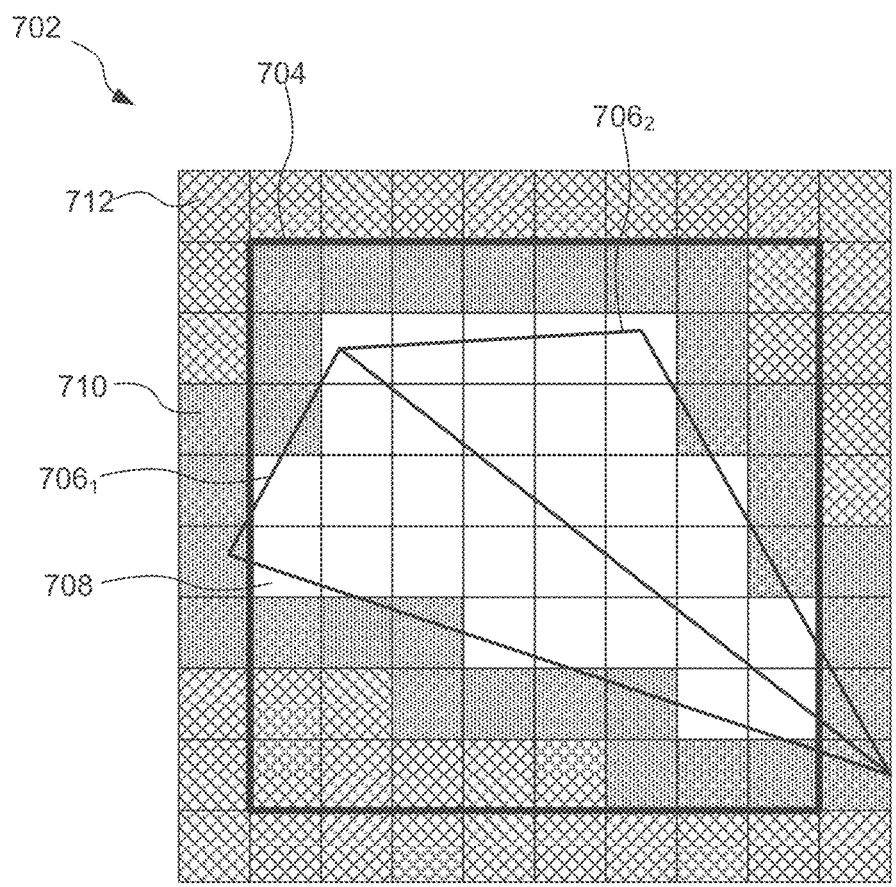
FIG. 7 illustrates an array of pixels some of which are covered by a mesh of primitives.

As noted above, the sharpening kernel may be applied to an unsharpened render target or it may be applied at the end of a series of texture filtering operations (mipmapping, texture filtering and anisotropic filtering), in which case it can be viewed as an additional texture filtering stage, independent of the rest of the rendering pipeline. In this latter case, a set of fragments for a portion of a polygon contained within a single tile (as employed by a tile-based renderer) may be processed in parallel. Unlike, for example, anisotropic filtering, where the elongated kernel incurs additional sampling operations of the source texture on a per-fragment basis, the separated discretization and refinement stages of the present image reconstruction method enables the re-use of sampled results from adjacent fragments. In other words, if one were to pre-combine the sharpening kernel with the texture filter, the resultant footprint would be much larger than the original texture filter and when processed independently, require many more samples (perhaps 9 times as many) to evaluate the filtered result, but the separated kernel avoids needless repetition of calculation. FIG. 7 illustrates a 10×10 array of pixels 702, including a tile 704 which represents an 8×8 array of pixels. Some of the pixels are covered by a mesh of primitives, which comprises the primitives 706₁ and 706₂. The pixels are represented with squares in FIG. 7, but it is to be understood that pixels have point positions (at the centres of the respective squares), i.e. the pixels do not cover the square areas. The pixels which are covered by the mesh of primitives are shown as white squares in FIG. 7 (e.g. pixel 708). When a 3×3 sharpening matrix is applied to each pixel position which is covered by the mesh of primitives (i.e. applied to, and centred on, each pixel shown as a white square in FIG. 7) the sharpening matrix will use values from some further pixel positions which are adjacent to pixels which are covered by the mesh of primitives, and the pixels at these further pixel positions are shown with a dotted pattern in FIG. 7 (e.g. pixel 710). Pixels which are not used by the sharpening filter are shown with cross-hatching in FIG. 7 (e.g. pixel 712). It is noted that although all of the pixels which are covered by the mesh of primitives (i.e. the white pixels) are within the tile 704, some of the pixels which are used by the sharpening filter (i.e. some of the pixels with a dotted pattern) are outside the tile 704. The pixels covered by a mesh of primitives (i.e. the white pixels), and the pixels which are used by the sharpening filter (i.e. the pixels with a dotted pattern) are used in an image processing method described herein. In particular texture coordinates are extended into the dotted regions to extrapolate for a 3×3 kernel. With reference to FIG. 7, each fragment within the polygonal mesh must output a value that is the result of a 3×3 kernel being applied to it and its neighbour. Within the interior of the mesh, most, if not all of the neighbours, will have been computed as part of the parallel processing of filtering operations (and will have been stored in some form of intermediate buffer for the purpose of the execution of the sharpening operation). For fragments that are missing neighbours, either because they are near the boundary of the mesh or the boundary of the tile, either additional filtering operations must be generated, centred at the missing fragments, or the kernel must be modified to exclude their contribution. Since the latter option may give rise to block artefacts at the tile boundaries, it is preferable to extrapolate the texture coordinates (using for example the screen space coordinate derivatives used to calculate the LOD or perform perspective correct interpolation of per-vertex defined coordinate attributes) and perform additional sampling operations, treating them as if the primitive extended into the neighbouring region (like a form of conservative rasterization). These additional filtering operations could alternatively be viewed as simply a form of partial (or entire if no neighbours are present) combination of the sharpening and texture filter kernels and evaluating them directly in texture space. However, again, these boundary fragments may contribute to multiple neighbours and so they are best seen (and implemented) as additional fragments that are not returned as output to the shader, but used as input to the tile-based convolution stage thus described. With this in mind, FIG. 7 describes a tile-based convolution operation that takes as input an extended patch of fragments covering both the interior of the polygons and their fattened boundary and outputting to the shader only the polygon interiors.

As described with reference to FIG. 7, a sharpening filter can be implemented as an additional texture filtering stage with an intermediate buffer extending texture coordinates out of tile and/or primitive boundaries. In this way, step S206 (of applying a refinement filtering function to the set of one or more filtered pixel values) may comprise: extending texture coordinates for a primitive in a tile outside of one or both of: (i) a boundary of the tile, and (ii) a boundary of the primitive; and using the extended texture coordinates to apply the refinement filtering function to one or more of the filtered pixel values which correspond to one or more fragments of the primitive.

As mentioned above, in some examples, the processing module 106 performs a graphics rendering process to determine rendered pixel values. The rendered pixel values can be considered to be filtered pixel values, which represent the result of processing image data using a set of one or more filtering functions. Graphics rendering processes are known in the art, and include rasterization and ray tracing techniques, to give just two examples. The rendered pixel values can be written to a render target, e.g. a memory in which rendered pixel values can be written to represent pixel values of an image. This memory may be on-chip memory, e.g. part of the image processing unit 102, or may be part of the memory 104. The memory 104 may be referred to as "main memory", "device memory" or "system memory". The render target may be referred to as a "frame buffer". In the methods described herein, the render target is considered to be an unsharpened render target, wherein a post-processing stage is performed (by the filtering module 110) to determine the refined pixel values. In particular, the covariance identification module 108 determines, for each of the rendered pixel values, an indication of the total covariance (e.g. on a per-fragment or per-pixel basis) of the one or more filtering functions used to render the pixel value. As mentioned above, the covariance identification module 108 may be part of the processing module 106, and may determine the covariance of the filtering functions used to render the pixel value as the pixel values are being rendered. It is noted that different pixel values may have different processing applied to them by the processing module 106, e.g. they may represent surfaces having different textures applied to them, and/or they may represent surfaces at different distances from the viewpoint (and therefore at different levels of detail). Therefore the total covariances of the filtering functions used to render the pixel values may be different for different pixel values.

Then, for each of the rendered pixel values, the filtering module 110 applies a respective refinement filtering function to the rendered pixel value to determine a respective refined pixel value. As described above, the covariance of the refinement filtering function applied to the pixel value is determined based on the determined total covariance of the set of one or more filtering functions used to render the pixel value. Again it is noted that "variance" is an example of "covariance".

There may be a target total covariance for the rendered pixel values, corresponding to a target footprint size of the pixel values. If the total covariance of the set of one or more filtering functions is above a target total covariance then the refinement filtering function is a sharpening function as described above, wherein the covariance of the sharpening function is the negative of the total covariance for the rendered pixel values. As described above, by setting the covariance of the sharpening function to be the negative of the total covariance of the set of one or more filtering functions in the discretization filtering stage a composite kernel can be produced with zero covariance and a flatter (i.e. better) frequency response in the passband. Since, different rendered pixel values may have different total covariances, the covariance of a sharpening function applied to different rendered pixel values may be different.

If the total covariance of the set of one or more filtering functions for a rendered pixel value is below the target total covariance, then the refinement filtering function is a blurring function. The covariance of the blurring function represents the difference between the target total covariance and the total covariance of the set of one or more filtering functions. This can help to reduce aliasing in the rendered pixel values (for example at polygon boundaries where sub-pixel precision is insufficient or in stochastic rendering employed in, for example, ray tracing).

The refinement of the pixel values generated by a graphics rendering process increases the quality of image reconstruction in 3D rendering by exploiting the separation of the reconstruction filter into discretisation and refinement kernels. Each fragment on screen is associated with a discretisation kernel of a parameterised width/scale/variance/quality. As described above, indications of the total covariances for the rendered pixel values may be stored as one or more additional channels of data along with the rendered pixel values (e.g. in place of an existing channel, such as the alpha channel) when a render target is generated. It is noted that there may be multiple additional channels of data for different matrix entries.

The filtering module 110 provides an intermediate post-processing stage between the render (performed by the processing module 106) and the display (or other final output) of the rendered image. The filtering module 110 applies an appropriate sharpening or blurring kernel on a per-pixel basis. A typical sharpening response would have negative covariance, relative to the input fragment, and a typical blurring response would be to compensate a deficit in covariance (or quality) of the computed fragment.

When the processing module 106 performs the graphics rendering process to generate the rendered pixel values, it may set indicators for rendered pixel values to indicate whether they represent geometry boundaries or interior regions of geometry. The covariances of the refinement filtering functions for the respective rendered pixel values may be determined based on the indicators that are set for the rendered pixel values. For example, the processing module 106 can flag up geometry boundaries (such as indicated through MSAA flags) so that the filtering module 110 can conservatively blur the results, and the processing module 106 can identify interior regions of geometry with high quality texture filtering so that the filtering module 110 can sharpen those regions. In particular, the covariance of the refinement filtering function applied by the filtering module 110 for a rendered pixel value is larger if the indicator for the rendered pixel value indicates that the rendered pixel value represents a geometry boundary than if the indicator for the rendered pixel value indicates that the rendered pixel value represents an interior region of geometry. In this way the image processing unit 102 is flexible and/or able to leverage geometry information (which is not usually directly available for post-processing approaches) to perform a refinement filtering on the rendered pixel values, thereby improving the quality of the final, outputted image values. Furthermore, the image processing unit 102 is able to maximise quality of higher quality filtering algorithms.

Figure 8:
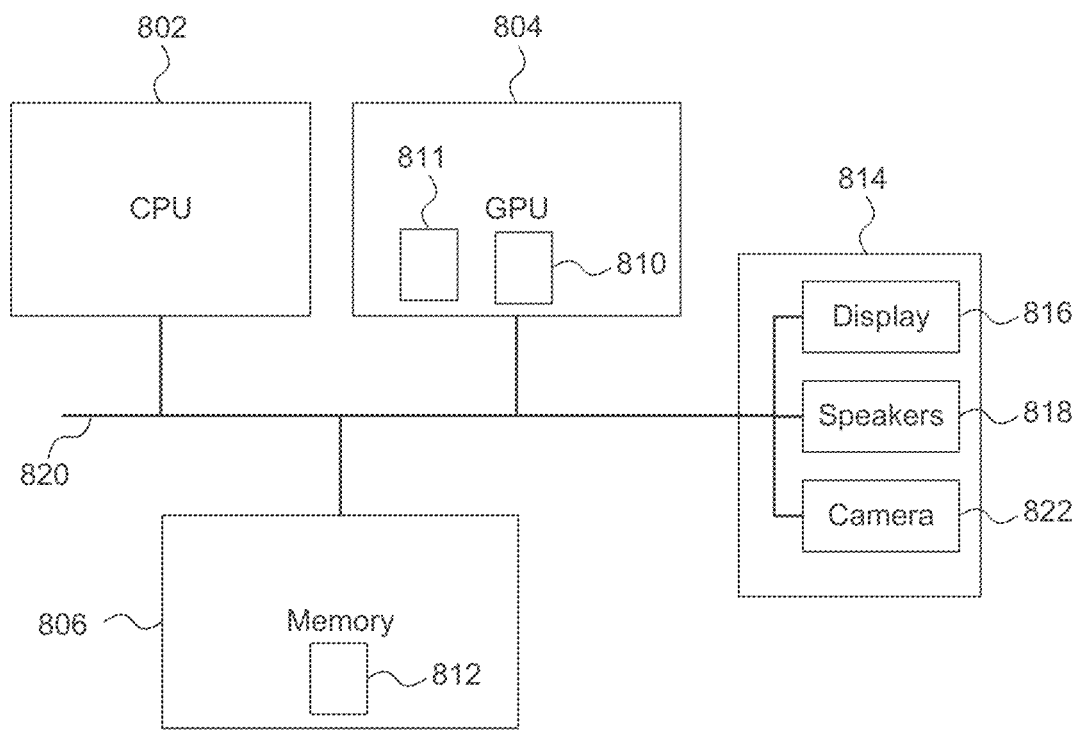
FIG. 8 shows a computer system in which an image processing unit is implemented.

FIG. 8 shows a computer system in which the image processing systems described herein may be implemented. The computer system comprises a CPU 802, a GPU 804, a memory 806 and other devices 814, such as a display 816, speakers 818 and a camera 822. An image processing unit 810 (corresponding to image processing unit 102) is implemented on the GPU 804, as well as a Neural Network Accelerator (NNA) 811. In other examples, the image processing unit 810 may be implemented on the CPU 802 or within the NNA 811 or as a separate processing unit in the computer system. The components of the computer system can communicate with each other via a communications bus 820. A store 812 (corresponding to memory 104) is implemented as part of the memory 806.

The image processing unit 102 is shown as comprising a number of functional blocks. This is schematic only and is not intended to define a strict division between different logic elements of such entities. Each functional block may be provided in any suitable manner. It is to be understood that intermediate values described herein as being formed by an image processing unit need not be physically generated by the image processing unit at any point and may merely represent logical values which conveniently describe the processing performed by the image processing unit between its input and output.

The image processing units described herein may be embodied in hardware on an integrated circuit. The image processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an image processing unit configured to perform any of the methods described herein, or to manufacture an image processing unit comprising any apparatus described herein. An integrated circuit definition dataset may be, for example, an integrated circuit description.

Therefore, there may be provided a method of manufacturing, at an integrated circuit manufacturing system, an image processing unit as described herein. Furthermore, there may be provided an integrated circuit definition dataset that, when processed in an integrated circuit manufacturing system, causes the method of manufacturing an image processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an image processing unit will now be described with respect to FIG. 9.

Figure 9:
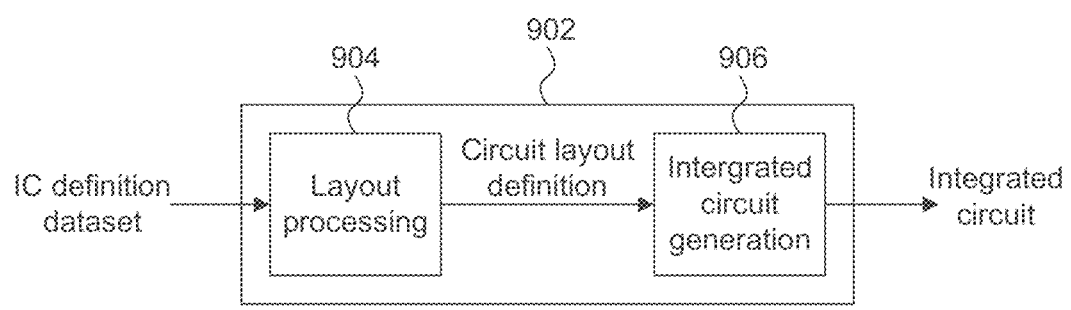
FIG. 9 shows an integrated circuit manufacturing system for generating an integrated circuit embodying an image processing unit.

FIG. 9 shows an example of an integrated circuit (IC) manufacturing system 902 which is configured to manufacture an image processing unit as described in any of the examples herein. In particular, the IC manufacturing system 902 comprises a layout processing system 904 and an integrated circuit generation system 906. The IC manufacturing system 902 is configured to receive an IC definition dataset (e.g. defining an image processing unit as described in any of the examples herein), process the IC definition dataset, and generate an IC according to the IC definition dataset (e.g. which embodies an image processing unit as described in any of the examples herein). The processing of the IC definition dataset configures the IC manufacturing system 902 to manufacture an integrated circuit embodying an image processing unit as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an image processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An image processing method comprising:
   determining a set of one or more filtered pixel values, wherein the one or more filtered pixel values represent a result of processing image data using a set of more than one filtering function;
   identifying a total covariance of the set of more than one filtering function; and
   applying a refinement filtering function to the set of one or more filtered pixel values to determine a set of one or more refined pixel values, wherein the refinement filtering function has a covariance that is determined based on the total covariance of the set of more than one filtering function; and
   wherein said identifying the total covariance of the set of more than one filtering function comprises:
   identifying, for each of the more than one filtering functions, a respective individual covariance; and
   summing the identified individual covariances.

2. The method of claim 1 wherein the covariances of the more than one filtering function and of the refinement filtering function are isotropic and are represented as variances.

3. The method of claim 1, wherein said applying a refinement filtering function to the set of one or more filtered pixel values comprises applying a sharpening function to the set of one or more filtered pixel values to determine a set of one or more sharpened pixel values, wherein the covariance of the sharpening function represents the negative of the total covariance of the set of more than one filtering function.

4. The method of claim 3, further comprising determining the covariance of the sharpening function by determining the negative of the total covariance of the set of more than one filtering function.

5. The method of claim 3, wherein said applying a sharpening function to the set or more filtered pixel values comprises:
   determining a sharpening matrix; and
   performing a convolution of the sharpening matrix with the set of one or more filtered pixel values.

6. The method of claim 1, wherein the total covariance of the set of more than one filtering function is below a target total covariance, and said applying a refinement filtering function to the set of one or more filtered pixel values comprises applying a blurring function to the set of one or more filtered pixel values to determine a set of one or more blurred pixel values, wherein the covariance of the blurring function represents the difference between the target total covariance and the total covariance of the set of one or more filtering functions.

7. The method of claim 1, wherein said determining a set of one or more filtered pixel values comprises performing texture filtering, wherein the set of one or more filtered pixel values represent a result of processing image data of a source image representing a texture using a set of filtering functions comprising more than one of: (i) a mipmap generation filtering function, (ii) a texture filtering function, (iii) an anisotropic filtering function, and (iv) a texture mapping function.

8. The method of claim 7, wherein more than one of: (i) the mipmap generation filtering function is a box filtering function, (ii) the texture filtering function is a tent filtering function, and (iii) the anisotropic filtering function is a sum of taps function.

9. The method of claim 7, wherein said applying a refinement filtering function to the set of one or more filtered pixel values comprises:
extending texture coordinates for a primitive in a tile outside of one or both of: (i) a boundary of the tile, and (ii) a boundary of the primitive; and
using the extended texture coordinates to apply the refinement filtering function to one or more of the filtered pixel values which correspond to one or more fragments of the primitive.

10. The method of claim 1 wherein said determining a set of one or more filtered pixel values comprises performing a graphics rendering process to determine rendered pixel values, wherein the method comprises, for each of the rendered pixel values:
determining an indication of the total covariance of the more than one filtering function used to render the pixel value; and
applying a respective refinement filtering function to the rendered pixel value to determine a respective refined pixel value, wherein the refinement filtering function applied to the pixel value has a covariance that is determined based on the determined total covariance of the set of more than one filtering function used to render the pixel value.

11. The method of claim 10, further comprising storing indications of the total covariances for the rendered pixel values as one or more additional channels of data.

12. The method of claim 11, wherein the indications of the total covariances for the rendered pixel values are per-pixel indications.

13. The method of claim 10, further comprising setting indicators for rendered pixel values to indicate whether they represent geometry boundaries or interior regions of geometry, wherein the refinement filtering functions for the respective rendered pixel values have covariances that are determined based on the indicators that are set for the rendered pixel values.

14. The method of claim 13, wherein the covariance of the refinement filtering function for a rendered pixel value is larger if the indicator for the rendered pixel value indicates that the rendered pixel value represents a geometry boundary than if the indicator for the rendered pixel value indicates that the rendered pixel value represents an interior region of geometry.

15. An image processing unit comprising:
a processing module configured to determine a set of one or more filtered pixel values, wherein the one or more filtered pixel values represent a result of processing image data using a set of more than one filtering function;
a covariance identification module configured to identify a total covariance of the set of more than one filtering function; and
a filtering module configured to apply a refinement filtering function to the set or more filtered pixel values to determine a set of one or more refined pixel values, wherein the refinement filtering function has a covariance that is determined based on the total covariance of the set of more than one filtering function; and
wherein the covariance identification module is further configured to, in identifying the total covariance of the set of more than one filtering function,
identify, for each of the more than one filtering functions, a respective individual covariance; and
sum the identified individual covariances.

16. The image processing unit of claim 15, wherein the total covariance of the set of more than one filtering function is below a target total covariance, and the filtering module is configured to apply a blurring function to the set or more filtered pixel values to determine a set of one or more blurred pixel values, wherein the covariance of the blurring function represents the difference between the target total covariance and the total covariance of the set of more than one filtering function.

17. The image processing unit of claim 15, wherein the processing module is configured to perform texture filtering, wherein the set of one or more filtered pixel values represent a result of processing image data of a source image representing a texture using a set of filtering functions comprising more than one of: (i) a mipmap generation filtering function, (ii) a texture filtering function, (iii) an anisotropic filtering function, and (iv) a texture mapping function.

18. The image processing unit of claim 15, wherein the processing module is configured to perform a graphics rendering process to determine rendered pixel values,
wherein the covariance identification module is configured to determine, for each of the rendered pixel values, an indication of the total covariance of the more than one filtering function used to render the pixel value, and
wherein the filtering module is configured to apply, to each of the rendered pixel values, a respective refinement filtering function to determine a respective refined pixel value, wherein the refinement filtering function to be applied to a rendered pixel value has a covariance that is determined based on the determined total covariance of the set of more than one filtering function used to render the pixel value.

19. A non-transitory computer readable storage medium having stored thereon an integrated circuit definition dataset that, when processed in an integrated circuit manufacturing system, configures the integrated circuit manufacturing system to manufacture an image processing unit, the image processing unit comprising:
a processing module configured to determine a set of one or more filtered pixel values, wherein the one or more filtered pixel values represent a result of processing image data using a set of more than one filtering function;
a covariance identification module configured to identify a total covariance of the set of more than one filtering function; and a filtering module configured to apply a refinement filtering function to the set or more filtered pixel values to determine a set of one or more refined pixel values, wherein the refinement filtering function has a covariance that is determined based on the total covariance of the set of more than one filtering function; and wherein the covariance identification module is further configured to, in identifying the total covariance of the set of more than one filtering function, identify, for each of the more than one filtering functions, a respective individual covariance; and sum the identified individual covariances.

\* \* \* \* \*